United States Patent [19]

Frevel et al.

[11] 3,897,511

[45] July 29, 1975

[54] REMOVAL OF α-ACETYLENES FROM GAS STREAMS

[75] Inventors: Ludo K. Frevel, Midland; Leonard J. Kressley, Saginaw, both of Mich.

[73] Assignee: The Dow Chemical Company, Midland, Mich.

[22] Filed: Nov. 12, 1973

[21] Appl. No.: 415,457

[52] U.S. Cl. .......... 260/681.5; 260/677 H; 252/463
[51] Int. Cl. ............................................. C07c 11/02
[58] Field of Search ...... 260/681.5, 677 H; 252/463

[56] References Cited
UNITED STATES PATENTS

| | | | |
|---|---|---|---|
| 2,398,301 | 4/1946 | Frevel | 260/681.5 |
| 3,076,858 | 2/1963 | Frevel et al. | 260/677 H |
| 3,549,719 | 12/1970 | Duyvermar et al. | 260/677 A |

OTHER PUBLICATIONS
Alumine properties, Tech. Paper No. 10 and Rev. Alcoa Research Laboratories, 1960, p. 58.

*Primary Examiner*—Veronica O'Keefe
*Attorney, Agent, or Firm*—David T. Thurston; Glwynn R. Baker

[57] ABSTRACT

Lower alpha-alkynes such as acetylene, methylacetylene, vinylacetylene, and ethylacetylene are effectively removed from hydrocarbon and other gas streams by contacting the contaminated gas with a finely divided metal catalyst consisting of copper plus at least one polyvalent activator metal supported on a high surface area gamma-alumina containing a defined amount of $Na_2O$. The catalyst is easily regenerated by oxidation and hydrogen reduction at moderately elevated temperatures.

4 Claims, No Drawings

REMOVAL OF α-ACETYLENES FROM GAS STREAMS

BACKGROUND OF THE INVENTION

This invention relates to an improved method of removing alpha-acetylenes from gas streams contaminated with small concentrations of the same.

Product streams of lower aliphatic hydrocarbons in particular are characteristically contaminated with small amounts of acetylenic impurities which are usually undesirable and often have to be removed at least to the level of a few parts per million in order for the gas stream to meet process requirements, for example, in polymerization processes or to avoid formation of explosive metal acetylides in equipment. Streams of olefins and diolefins such as ethylene, propylene, butylene, and butadiene are common examples where minor amounts of corresponding alkynes are often found.

It is known that acetylenic impurities can be selectively hydrogenated and thereby removed from a gas stream by passing a mixture of the gas with hydrogen over a finely divided promoted copper catalyst. Such a method is described in U.S. Pat. No. 3,076,858. A selective oxidation process for accomplishing the same end using a cupric oxide-zinc oxide catalyst is described in U.S. Pat. No. 3,549,719. Catalysts consisting of finely divided copper alone or mixed with an activator metal are also known to be useful for this purpose by selectively decomposing or polymerizing acetylenic contaminants. Catalysts of this type are disclosed in U.S. Pat. No. 2,398,301 and British Pat. No. 835,751. However, all of these prior art processes are subject to one or more disadvantages. With some, other contaminants are introduced into the gas stream being purified, for example, hydrogen is introduced in selective hydrogenation and an oxidation process merely converts one contaminant into one or more different contaminants even though these may be of less disadvantage. Other known purification processes use catalysts which may be hard to regenerate to their original activity, they may lose their effectiveness rapidly, or they may not be sufficiently active to reduce the contaminant concentration to as low a level as desired.

SUMMARY OF THE INVENTION

It has now been found that alpha-acetylene contaminants are effectively removed from a gas stream when the stream is contacted with a supported catalyst consisting essentially of a mixture of finely divided copper metal and a minor proportion of at least one polyvalent activator metal supported on gamma alumina having a surface area of at least 10 square meters per gram and containing about 0.1 to 1.5 percent by weight of $Na_2O$. Preferably, the copper metal comprises about 3 to 13 percent by weight of the alumina. The catalyst is easily regenerated when its activity begins to fall off by contacting it with an oxygen-containing gas and subsequently reducing the oxidized catalyst with hydrogen. Thus, the catalyst can be run for extended periods of time with many such cycles of processing, oxidation, and reduction steps with little or no loss of catalytic activity.

DETAILED DESCRIPTION

The metals useful as activators in the catalyst of this invention are metals which are normally or can be polyvalent and whose oxides are reducible by hydrogen or a hydrogen-inert gas mixture at a temperature below about 350°–400°C. Preferably, the weight of activator metal or metals is less than the weight of copper in the catalyst and most preferably is about 1–20 percent of the combined weight of copper and activator. Suitable activator metals include silver, platinum, palladium, manganese, nickel, cobalt, chromium, and molybdenum.

The reactant support employed is a gamma-alumina having a high surface area (BET surface area) of at least 10 square meters per gram and particle sizes in the range of those substantially passing a No. 8 sieve (U.S. Sieve Series) to those passing a No. 18 sieve, but generally retained on a No. 30 sieve. It is also essential that the gamma-alumina contain about 0.1 to 1.5 percent by weight of sodium, present in combined form with the alumina and reported as $Na_2O$. A finer grade of gamma-alumina may be employed if the gamma-alumina is first granulated to provide particle sizes in the specified range.

In carrying out the preparation of the present reagent, a relatively concentrated aqueous solution containing copper is prepared by dissolving about 2.5 to 3 parts by weight of any of the copper salts readily soluble in water, for example, $CuSO_4.5H_2O$, $Cu(NO_3)_2.3H_2O$ or $CuCl_2.2H_2O$ in 1 part by weight of water. More preferably, the water is acidified with about 5 to 10 percent by weight of a mineral acid such as HCl, $HNO_3$ or $H_2SO_4$. The water-soluble salts of any activator metals to be employed are dissolved in the copper salt solution in the requisite amount. This concentrated aqueous solution is poured onto a quantity of gamma-alumina in the requisite amount to provide from about 3 to about 13 percent by weight of reduced metal based on the total weight of the prepared agent. The mixture is stirred briefly and then dried, as in a 110°–160°C. oven, and then roasted at a temperature of about 250°–400°C., and more preferably 290°–400° C. During roasting, the copper salts and activator metal salts are converted to oxides or anhydrous metal salts in such a manner that a single phase is formed with the alumina, as determined on examination by X-ray diffraction. This step is not completely understood but is essential to the proper preparation of the present highly efficient, high capacity reagent.

Preparation of the reagent in reduced metal form is completed upon passing a stream of hydrogen, more preferably a mixture of hydrogen and nitrogen, over a bed of the roasted material for about 30 minutes or more while the bed is maintained at a temperature of about 200°–400°C., thus reducing the roasted material to metal form. About two times the stoichiometric amount of hydrogen suffices to make the reduction as complete as desired. The resulting reagent consists of extremely finely divided copper, with admixed activator metal, intimately and widely dispersed throughout a high surface area gamma-alumina.

While earlier known reagents when freshly prepared exhibit a higher efficiency after having been reoxidized once and again reduced, the present reagent does not need such activation treatment, though activation treatment does not adversely affect the performance of the reagent.

However, the reduction or regeneration temperature critically affects the dynamic efficiency of the reagent. The higher the temperature at regeneration, the higher the efficiency during subsequent use over a longer term of use. Moreover, the bed capacity is larger. If regeneration temperatures are unduly high, support degeneration tends to occur with resulting lowering in reagent efficiency and capacity. Generally, a regeneration temperature of about 250°–300°C. is preferred, and especially a temperature of about 270°C.

The prepared and reduced reagent is used according to the present invention by simply placing it in an enclosed zone or tube in which there is obtained intimate contact between the reagent and the gas flowing through the enclosed zone. The reagent has to be heated only moderately since it is effective at temperatures as low as about 40°C., and though temperatures as high as 250°C. may be employed if desired. A process temperature of about 50°–100°C. is preferred.

The pressure of the gas stream during acetylene removal is believed to have little or no effect on the process.

Alpha-acetylenes which are effectively removed by the catalyst, apparently by a polymerization reaction from which the polymer product is adsorbed on the catalyst, include acetylene, methylacetylene, ethylacetylene, and vinylacetylene. Generally, acetylenic impurities such as these are found in streams of corresponding hydrocarbons less highly unsaturated, for example, in streams consisting largely or in some part of the lower olefins and diolefins, i.e., ethylene, propylene, butylene, butadiene, isoprene, and the like. Of course, these acetylenic hydrocarbons are also removable by the present catalyst from other gases such as air, inert purge gases, and the like. The process is particularly useful for removing small amounts of acetylene from $C_{1-2}$ hydrocarbon and other gas streams.

Streams of such gases containing up to several percent by volume of acetylenic impurity can be purified by passing over the present catalyst, but optimum results are obtained when no more than about 0.5 percent of acetylenes is present. Under these conditions, the gas may be passed through the catalyst bed at 40°C. or higher at a rate as high as 1000–5000 liters per liter of catalyst bed per hour with reduction of acetylene content to less than 10 parts per million and under preferred conditions, essentially to zero.

When the catalyst begins to lose its effectiveness, the flow of the gas stream through the catalyst bed is stopped, or, preferably, switched by valving to an alternate bed, while the exhausted bed is regenerated. A partial regeneration may be accomplished under some conditions by desorption with an inert gas, preferably nitrogen, at a temperature from ambient to about 250°C. followed by reduction with hydrogen, preferably a mixture of a minor proportion of hydrogen in nitrogen or argon at about 100°–400°C., preferably at 150°–250°C. However, for full regeneration of an exhausted catalyst it is necessary to flush the catalyst bed with a desorbing gas such as hydrogen or nitrogen, then to reoxidize the catalytic metals by passing an oxygen-containing gas through the bed at about 200°–400°C., and finally to reduce the oxidized catalyst with hydrogen as described above. The oxygen-containing gas is preferably a mixture of nitrogen, argon, or $CO_2$ with about 0.5–10 percent oxygen.

To illustrate the reagent of the invention and the method of using the same, reagents were prepared as follows:

A. A portion of gamma-alumina containing 0.1 to 1.5 percent by weight $Na_2O$ and having particle sizes substantially all passing a No. 8 to a No. 18 sieve (U.S. Sieve Series) was impregnated with an aqueous solution of cupric sulfate and nickel sulfate containing 99 parts of copper per part of nickel. The impregnated gamma-alumina was dried and roasted, thus converting the metal salts to a light green mixed oxide of copper and aluminum present as a single phase. The roasted material was then treated with a mixture of nitrogen and hydrogen at a temperature of 250°C. for a sufficient period (about 3 hours) for the oxides to be reduced to the metal. The total metal content of the resulting reagent was about 5 percent by weight. The BET surface area of the reagent was found by test to be 215 square meters per gram.

B. 38.5 grams of activated alumina containing 0.1 to 1.5 percent by weight $Na_2O$ and having particle sizes substantially all passing a No. 8 to a No. 18 sieve was impregnated with 14 milliliters of an aqueous solution containing 8.7 grams of $Cu(NO_2)_2.3H_2O$ and 0.89 gram of $AgNO_3$. The impregnated alumina was dried for one hour at 10°C., then roasted at 350°C. for three hours to form a light green mixed oxide of copper and aluminum present as a single phase, and finally, the oxide was reduced at 290°C. with a nitrogenhydrogen mixture to yield alumina impregnated with black, finelydivided metal. The metal consisted of 90 percent of copper and 10 percent of silver. The metal content of the reagent prepared was about 6.5 weight percent.

C. A portion of activated gamma-alumina containing 0.1 to 1.5 percent by weight $Na_2O$ and having particle sizes substantially all passing a No. 8 to a No. 18 sieve was impregnated with an aqueous solution of cupric nitrate and silver nitrate containing 4 parts of copper per part of silver. The impregnated alumina was dried for one hour at 110°C., then roasted at 350°C. for three hours to form a light green mixed oxide of copper and aluminum present as a single phase, and finally, this oxide was reduced at 290°C. with a nitrogenhydrogen mixture to yield alumina impregnated with black, finely-divided metal. The metal consisted of 80 percent by weight of copper and 20 percent by weight of silver. The metal content of the reagent was 6.8 weight percent.

D. 41.5 grams of an activated gamma-alumina having a BET surface area greater than 10 square meters per gram containing 0.1 to 1.5 percent by weight $Na_2O$ and having particle sizes substantially all passing a No. 8 to a No. 18 sieve was impregnated with 12 milliliters of an aqueous solution containing 6.8 grams of $Cu(NO_3)_2.3H_2O$ and 5.45 grams of $Ni(NO_3)_2.6H_2O$. The impregnated alumina was dried for 2 hours at 110°C. and then roasted at 350°C. for 3 hours to form a light green mixed oxide of copper and aluminum present as a single phase. Reduction of the copper and nickel oxides to the respective metals was effected with hydrogen at 400°C. The reduced metal consisted of 3 parts of copper per 2 parts by weight of nickel. The metal content of the reagent was about 6.6 weight percent.

E. 10 grams of $Ni(NO_3)_2.6H_2O$, 4 grams of $Co(NO_3)_2.6H_2O$, 4 grams of $Cr(NO_3)_3.9H_2O$, 8 grams of 50 percent by weight $Mn(NO_3)_2$ aqueous solution and 1.0 gram of $AgNO_3$ were dissolved in an aqueous solution consisting of 100 milliliters of water plus 10 milliliters of concentrated nitric acid (16 normal). After solution of the above salts was complete, 280 grams of $Cu(NO_3)_2.3H_2O$ were dissolved in solution yielding a total of 240 milliliters of impregnating solution. This impregnating solution was dispersed on 747 grams of gamma-alumina. The gamma-alumina contained 1.18 percent by weight of $Na_2O$. In addition, the gamma-alumina had a BET surface area of about 177 square meters per gram and a particle size such that the gamma-alumina passed a No. 8 sieve and was retained on a No. 18 sieve. The impregnated alumina was dried at about 160°C. for about 2 hours. The dried material was then roasted at 400°C. for about 5 hours. At this time, the impregnated alumina was an olive green color. On X-ray diffraction examination, no separate phase for copper oxide was detected. Instead, all the metal oxides had been transformed into a single phase.

Thereafter, about 128 grams of the dried and roasted impregnated alumina was packed as a bed in a column consisting of a length of iron pipe having an inner diameter of 1 inch and a length of 8 inches, retaining screens top and bottom and pipe connections at each end for passing various gases through the bed of reagent contained therein. The column was also provided with heating means. A stream of hydrogen containing about 90 percent by volume of nitrogen was passed through the column while the impregnated alumina was maintained at a temperature of about 300°C. Reduction of the copper oxide and activator metal oxides to metallic form was completed in about 30 minutes.

EXAMPLE 1

The reactor was a small stainless steel cylinder (10.5 cm. long × 1.75 cm. O.D.) equipped with 0.32 cm. inlet and outlet stainless steel tubing and pressure valves. The reactor cylinder fitted within an electrically controlled heating jacket. The cylinder was filled with 7.3 g. of reoxidized catalyst prepared essentially as described under (E) and the catalyst was then reduced in place at 180°C. by passing a 95% $N_2$ - 5% $H_2$ mixture through it at about 200 ml./min. for one hour. After reduction, the reactor was cooled to room temperature, purged with nitrogen, pressurized to 120 p.s.i.g. with ethylene, and heated to about 160°C. before feeding ethylene containing 14 ppm CO and 47 ppm acetylene through the catalyst bed at an initial pressure of 319 p.s.i.g. and a controlled space velocity of 978 vol.-/vol./hr. (STP). The effluent ethylene was monitored periodically for acetylene but none was detected during the 50.7 hours of operation. The catalyst temperature was maintained at 160°-170°C. during the operation except for a brief hot spot of about 190°C. which developed during the first half hour. The pressure in the system declined gradually from an initial 319 p.s.i.g. to a final 139 p.s.i.g.

EXAMPLE 2

Argon containing 15 ppm carbon monoxide and 50 ppm acetylene was passed through a bed of reduced catalyst at 160°C. as described in Example 1 using the same apparatus. Gas flow was maintained at the exit at about 150 ml./min. under ambient conditions. The effluent was monitored for CO content by passing through an infrared cell and it was checked for acetylene at intervals with ammoniacal cuprous sulfate reagent sensitive to 1 ppm acetylene. After 435 liters of gas had been passed through the reactor in 48 hrs., the reactor was heated to 200°C. with hydrogen passing through for one hour. It was then cooled to room temperature, flushed with argon, and reheated to 160°C. An additional 1175 liters of the original feed gas was then passed through in 117 hours of running time. Neither carbon monoxide nor acetylene was detected at any time during the two periods of operation.

EXAMPLE 3

A vaporized $C_4$ stream containing 49.3 vol. percent butadiene, 42.9 percent butenes, 7.2 percent butanes, 0.4 percent alpha-acetylenes (largely vinylacetylene, and 0.2 percent $C_3$'s was passed through a glass tube containing 138.6 g. of reduced catalyst prepared similarly to (E) above. Gas flow was 150 ml./min. (64 no./-vol./hr.) at ambient temperature and pressure with the catalyst bed held at 49°-59°C. The first 106 g. of effluent showed no acetylenes detectable by $AgNO_3$ titration (less than 10 ppm), the next 26 g. of product contained 50 ppm. acetylenes, while the final 9 g. of effluent contained 160 ppm acetylenes.

After this experiment, the adsorbed hydrocarbons were stripped off the catalyst with nitrogen and the polymerized acetylenes were burned off at 300°C. by passing a stream of nitrogen containing 1 percent oxygen. The catalyst was then reduced with a 95% $N_2$ - 5% $H_2$ stream at 250°C. for 3 hours.

EXAMPLE 4

A 16.8 g. portion of the regenerated catalyst from Example 3 was loaded into a smaller glass tube, reduced again with 95% $N_2$ - 5% $H_2$ at 300°C., and cooled with nitrogen passing through the bed. The reactor tube was then placed within a heater at 50°C. and a stream of 99+% butadiene containing 138 ppm alpha-acetylenes was passed through the catalyst bed at the rate of 0.4 g. mole per hour. Condensed samples of the effluent were titrated periodically with $AgNO_3$ to determine acetylene content. None was detected for 36.7 hours during which time 784 g. of feed had passed through the catalyst. The next 53 g. of product collected over a two hour period following a restart after a weekend shutdown contained 30 ppm acetylenes. The catalyst was then purged and regenerated as described in Example 3.

EXAMPLE 5

The general procedure of Example 4 was repeated in cyclic operation using the regenerated catalyst from that example and a $C_4$ hydrocarbon feed containing about 0.3% $C_4$ $\alpha$-acetylenes. The process phase of each cycle was thereby shortened to about 70 minutes with the regeneration optimized at 30 minutes stripping at 300°C. with nitrogen, 120 minutes burn-off with one percent oxygen in nitrogen at 0.5 liter/min. and ambient temperature and pressure, and 60 minutes of reducing with 1.5% $H_2$ in nitrogen at 250°C. For cycles 3-9, the process phase was stopped when the product showed 100–200 ppm acetylenes. After the first cycle, the weight of feed processed averaged 15 g. per cycle. In the tenth cycle, the process temperature was maintained at 50°C. and the feed stream was the butadiene used in Example 4. A total of 1036 g. of butadiene was processed before any $\alpha$-acetylenes were detected in the effluent product.

We claim:

1. A method of removing alphaacetylenes from a gas stream containing the same, said gas stream consisting of one or more hydrocarbons, the inert gases helium, argon and minor proportions of CO and $\alpha$-acetylenes and being substantially free of hydrogen which comprises contacting said gas stream with a supported catalyst consisting essentially of a mixture of finely divided copper metal and a minor proportion of at least one polyvalent activator metal, said activator metal being one of the group of silver, platinum, palladium, manganese, nickel, cobalt, chromium and molybdenum, the weight of the activator metal or metals being from 1 to 20 percent of the combined weight of copper and activator, supported on gamma-alumina having a surface area of at least 10 square meters per gram and containing about 0.1 to 1.5 percent by weight of $Na_2O$, said supported catalyst having been oxidized and reduced before use, said contacting being carried out at between about 40° and 250°C.

2. The method of claim 1 wherein the gas stream is contacted with the catalyst at about 40°–250°C.

3. The method of claim 1 wherein the copper metal comprises about 3 to 13 percent by weight of the alumina.

4. The method of claim 1 wherein after contacting the acetylene-containing gas with the catalyst for a substantial period of time, the flow of said gas over the catalyst is stopped, a stream of oxygen-containing gas is passed over the catalyst at about 200°–400°C. until the copper and activator metal are substantially oxidized, the oxidized catalyst is contacted with hydrogen at about 200°–400°C. until reduction of the oxidized metals is essentially complete, the flow of hydrogen is stopped, and the flow of acetylenecontaining gas over the catalyst is resumed, and the above cycle of oxidation, reduction, and reuse is repeated.

* * * * *